United States Patent [19]

Richards, Jr.

[11] Patent Number: 5,202,924
[45] Date of Patent: Apr. 13, 1993

[54] STEREO FM RADIO RECEIVER WITH VARIABLE BAND PASS STEREO DECODER

[75] Inventor: Oliver L. Richards, Jr., N. Grosvenor Dale, Conn.

[73] Assignee: Allegro Microsystems, Inc., Worcester, Mass.

[21] Appl. No.: 455,050

[22] Filed: Dec. 22, 1989

[51] Int. Cl.$^5$ ............................................. H04H 5/00
[52] U.S. Cl. ................................................. 381/13
[58] Field of Search ................. 381/4, 13, 15, 12; 331/20, 23, 25; 455/46, 65, 208, 265, 266, 254

[56] References Cited

U.S. PATENT DOCUMENTS

| | | | |
|---|---|---|---|
| 3,447,084 | 5/1969 | Haner et al. | 455/46 |
| 3,909,735 | 9/1975 | Anderson et al. | 331/23 |
| 4,397,040 | 8/1983 | Jandel et al. | 455/219 |
| 4,480,335 | 10/1984 | Kishi | 381/13 |
| 4,485,483 | 11/1984 | Torick et al. | 381/14 |
| 4,516,083 | 5/1985 | Turney | 331/25 |
| 4,525,686 | 6/1985 | Yokoya | 381/15 |

OTHER PUBLICATIONS

Floyd, M. Gardner, "Phaselock Techniques", John Wiley & Sons, Inc., Apr. 1967, pp. 50-54.
R. H. Stockwell et al., "An Inductorless, Monolithic Stereo Decoder", Digest of Technical Papers, Feb. 1970 IEEE Conf., pp. 106-107.
T. E. Rucktenwald et al., "FMX Mobile Reception", Sep. 1988, IEEE Conf., pp. 921-928.
A. G. Bose et al., "A Theoretical and Experimental Study of Noise and Distortion in the Reception of FM Signals", RLE Technical Report No. 540, Jan. 1989, pp. 44-45.

*Primary Examiner*—Forester W. Isen

[57] ABSTRACT

A stereo decoder for use in a stereo FM radio receiver includes a phase-locked loop; for detecting the 19 KHz pilot signal in the FM composite signal; for generating the 38 KHz subcarrier for use as a reference signal to a double balanced gating circuit that combines the L−R and L+R components of the stereo composite signal to produce the left audio and right audio signals separately; and for providing a 19 KHz reference signal for use in the pilot detector and pilot indicator circuit. The phase-locked loop includes a mixer to which a 19 KHz reference and the composite signals are applied, a low pass filter switchable from a first bandpass of about 300 Hz to a second bandpass of about 10 Hz connected to the output of the mixer a voltage controlled oscillator connected to the output of the filter that has a natural operating frequency of 38 KHz and a divide-by-two circuit connecting the oscillator to an input of the mixer. The bandpass filter is normally (in the pilot search mode condition) switched to the 300 Hz bandpass and when the pilot indicator circuit is actuated the bandpass filter is switched to the 10 Hz bandpass (pilot locked mode).

5 Claims, 2 Drawing Sheets

STEREO FM RADIO RECEIVER WITH VARIABLE BAND PASS STEREO DECODER

BACKGROUND OF THE INVENTION

This invention relates to a stereo decoder with a phase-locked loop for use in a stereo FM radio receiver and more particularly pertains to such a stereo decoder wherein the bandpass of the phase-locked loop is switched from a broad to a narrow range of frequencies as the operational status of the loop changes from a pilot-signal acquisition mode to a pilot-signal locked mode.

The standard composite-stereo-multiplexed signal at the output of an FM radio discriminator circuit includes a left plus right (L+R) singlesided baseband of audible frequencies, a pilot signal at 19 KHz, and a left minus right (L−R) baseband centered about a suppressed 38 KHz subcarrier. These standard FM-radio stereo signal features are illustrated in FIG. 1.

It is usual practice to obtain the separated left and right audio signals by means of a stereo decoder having a phase-locked loop oscillator 10 to supply the missing 38 KHz subcarrier and a double balance gating circuit 12 or other mixer as illustrated in FIG. 2. The composite stereo signal is presented at the input conductor 14. Typically, in such prior art stereo demodulators, an "upper pair" of switching transistors in the double balanced mixer operate fully switched; i.e., off and on effecting full left and right audio signal separation.

The frequency and phase of the 38 KHz oscillator 10 are locked and synchronized to those of the 19 KHz pilot signal in the composite stereo signal. The conventional phase-locked loop includes the voltage controlled oscillator VCO 16, the divider circuit 18, the phase comparator 20 and the low pass filter 22 having a bandpass of about 300 Hz. The output of the VCO 16 is a fixed amplitude 38 KHz square wave signal. Such a conventional system is described by Stockwell and Camenzind in their paper "An Inductorless Monolithic Stereo Decoder", International Solid State Circuits Conference (Feb. 19, 1970) pages 106–107. A lamp 24 may be energized only when the 19 KHz pilot of a radio signal is locked by the phase-locked loop demodulator. This is accomplished by providing an inverting amplifier 26 connected to the output of the VCO 16 that in turn feeds another divide-by-two frequency divider 28. The composite signal from conductor 14 and the output of the divide-by-two divider 28 are fed into a mixer, e.g. double balanced gating circuit 30 that serves as a phase comparator and provides a binary one or high voltage level output only when the VCO 16 is locked to the 19 KHz pilot. This is followed by a smoothing capacitor 32, a Schmitt trigger circuit 34 and the lamp 24 to indicate the presence of the pilot signal to the operator.

FM radio provides the best quality broadcast radio reception available today. It offers wide-band high fidelity stereo sound that is relatively free from static, fading and interference from other stations. However, multipath noise in FM receivers remains a vexing problem especially for FM receivers in vehicles. Multipath noise comes from interference within an FM receiver between two signals arriving at the receiver along two different length paths from the same broadcasting station. Multipath noise in a fast moving FM receiver may take the form of bursts of noise and/or distortion.

Some currently used blend-function circuits reduce the stereo separation as a function of signal-to-noise ratio and are capable of moderating multipath noise. However, stereo separation and thus sound quality are degraded.

The signal-to-noise ratio in an FM receiver may be improved according to the disclosure by Torick et al in U.S. Pat. No. 4,485,483 issued Nov. 27, 1984, by a system of FM broadcasting and receiving that is denoted herein as the FMX system. "FMX" is a TRADEMARK of Broadcast Technology Partners, Bloomfield Hills, Mich. It is said that FMX receivers can provide reduction of background and multipath noise without loss of stereo separation. However, multipath reception (e.g. directly and indirectly from one station) is known to cause problems under some circumstances in the FMX decoder that lead to degradation in the sound.

It is an object of this invention to provide an improved FM stereo decoder to reduce or eliminate the effects of multipath interference in standard FM and in FMX radio receivers.

SUMMARY OF THE INVENTION

A stereo FM radio receiver has a stereo decoder that includes a composite-stereo-multiplexed-signal input conductor connected to the input of a phase-locked loop and connected to one input of a binary signal generating means. The binary signal generating means is for producing one output level when the loop is operating in the pilot acquisition mode and another state when the loop is operating in the pilot locked mode. The bandpass of the phase-locked loop is primarily determined by an electrically-switchable dual-bandpass filter that is incorporated in the loop. The control input of the dual bandpass filter is connected to the output of the binary signal generating means so that when the loop is operating in the pilot acquisition mode the loop bandpass covers several hundred Hertz of the audible frequency range but when the loop is operating in the pilot locked mode the loop bandpass only covers signals in the subaudible frequency range.

The dominant mechanisms by which multipath conditions result in noise in FM receivers has only recently become better understood. The present invention recognizes that a significant part of multipath noise is attributable to intermittent loss of lock on pilot signal in the stereo decoder portion of the receiver.

This invention recognizes the it is important to provide a fast pilot acquisition capability in a stereo decoder, not for initially locking to a broadcast station's pilot but for quickly recapturing a weak pilot that could not remain locked in the decoder or recapturing a pilot that was temporarily lost in a burst of noise or other interfering signals. The disturbance to the listener, owing to long pilot recapture times, is especially objectionable during multipath interference conditions.

This invention also recognizes that for multiple reasons there often occurs at the output of a standard FM radio discriminator, in addition to the FM-detected composite-stereo-signal with its 19 KHz pilot component, an unwanted signal that is near enough to 19 KHz to compete with the pilot for control of the VCO in the phase-locked loop.

There are several sources of such superfluous and troublesome near-19 KHz noise signals including modulation in the IF section of the L−R and the L+R components of the composite signals during multipath reception conditions.

When the bandwidth of the phase-locked loop is broad enough to include the 19 KHz pilot and the adjacent unwanted signal or signals, that "noise" can take over control of the 38 KHz oscillator and the loop from the 19 KHz pilot. This of course causes gross disturbance of the sound whether the "takeover" is for long periods or comes in repetitive bursts. The reduced phase-locked loop bandwidth to subaudio frequencies in this invention that occur while the 38 KHz oscillator is locked to a station pilot prevents such a takeover by the near-19 KHz noise.

As noted above, the phase-locked loops in stereo decoders of the prior art have a fixed bandpass of about 300 Hz. The stereo decoder of the present invention operates in a pilot acquisition mode with a bandpass of preferably about 300 Hz but preferably operates in a lock mode with a subaudible bandpass of about 10 Hz.

DESCRIPTION OF THE PREFERRED EMBODIMENT

Figure 1:
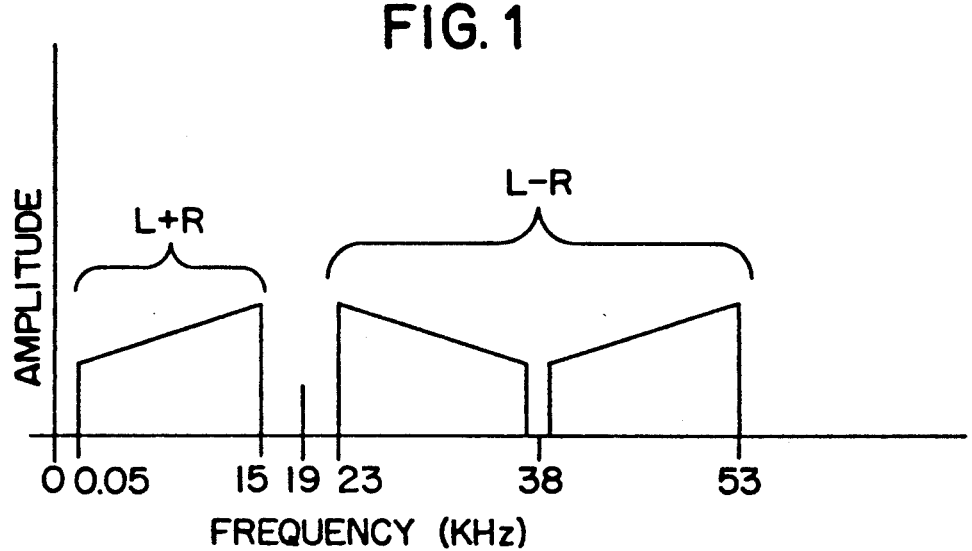
FIG. 1 shows the frequency spectrum of a standard composite FM-radio stereo signal lying within adjacent audio and supersonic ranges.
Figure 2:
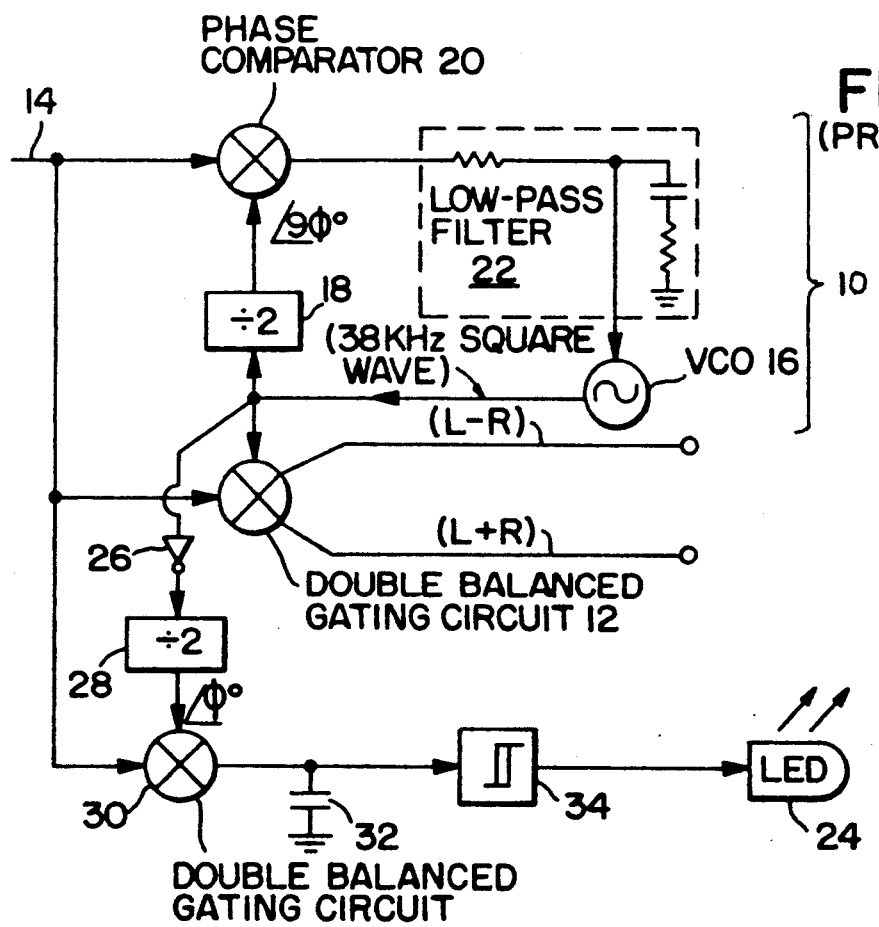
FIG. 2 shows a block diagram of a stereo decoder of the prior art.
Figure 3:
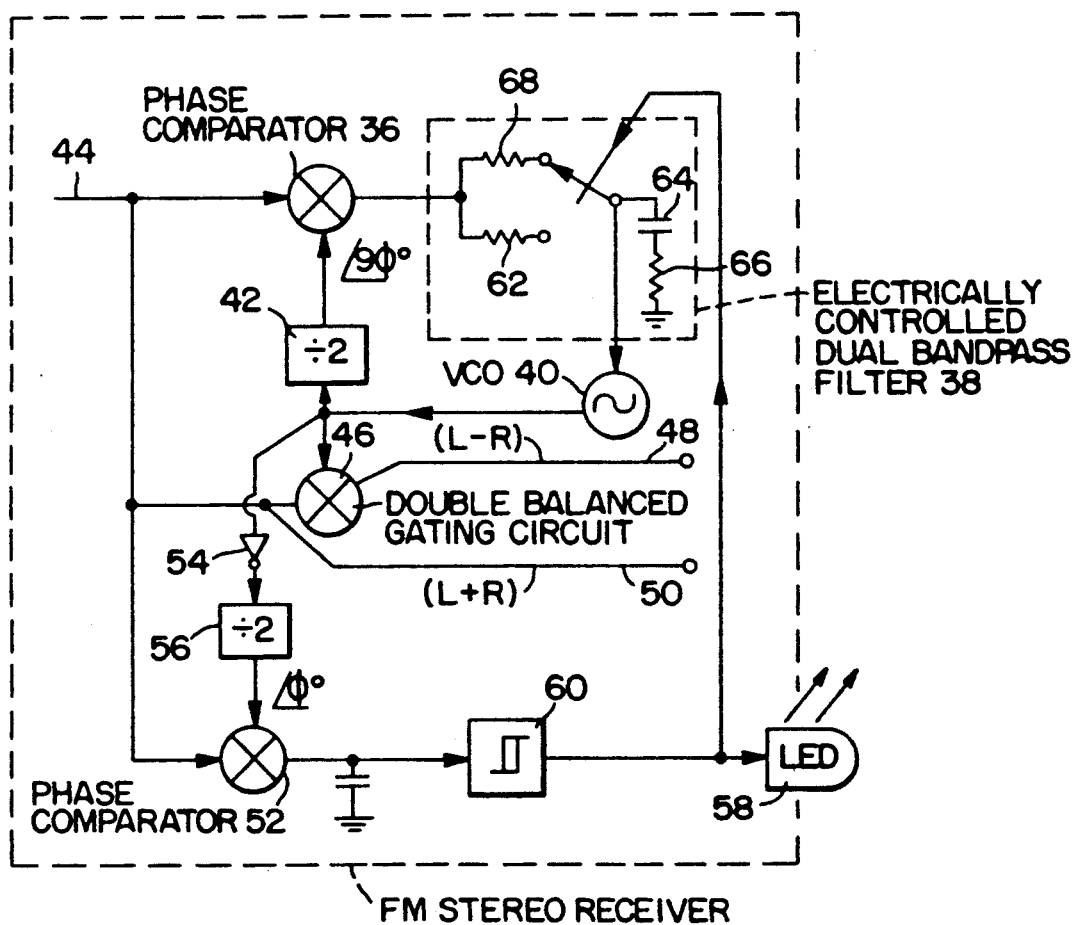
FIG. 3 shows a block diagram of a stereo FM broadcast radio receiver with a dual bandwidth stereo decoder of this invention.

Referring to FIG. 3, a phase-locked loop portion of a stereo decoder 41 is made up of a phase comparator 36, an electrically-switchable dual-bandwidth low pass filter 38, an electrically controlled oscillator 40 and a divide-by-two frequency divider 42, all tandemly connected in the loop as shown. The decoder input conductor 44 is connected to the input of phase comparator 36 and the oscillator 40 when locked to the 19 KHz pilot of the composite stereo signal appearing at the input conductor 44, will produce a 38 KHz output voltage having zero crossings coinciding with those of the incoming pilot. A conventional double balanced gating circuit 46 has one input connected to the output of the oscillator 40 and another input connected to the input conductor 44, and produces a L−R (left minus right) audio signal at conductor 48 and a L+R (left plus right) audio signal at conductor 50.

A stereo-on lamp-indicating circuit includes another phase comparator 52 having one input connected to the input conductor 44 and another input connected to the oscillator 40 via an inverter 54 and another divide-by-two frequency divider 56. The stereo-on indicating circuit also includes a LED 58 connected to the output of the phase comparator 52 via a Schmitt trigger circuit 60, or other voltage comparator or threshold detector circuit, so that only when the oscillator 40 is locked to the pilot the LED 58 is on.

The output of the Schmitt trigger circuit 60 is also connected to the control input of the dual bandpass filter 38. When the loop is operating in the pilot acquisition or search mode, the filter 38 is composed of resistor 62, capacitor 64 and resistor 66. But when the phase-locked loop is operating in the pilot-locked mode, the filter is composed of resistor 68, the capacitor 64 and the resistor 66. The filter component values are given in the Table.

TABLE

| Component | Values |
| --- | --- |
| 62 | 500K ohms |
| 64 | .47 uf |
| 66 | 3.3K ohms |
| 68 | 68K ohms |

The bandpass of the loop in acquisition mode is about 300 Hz whereas in pilot-locked mode the bandpass of the loop is 10 Hz. In general it is required that the lock mode bandpasses include only subaudible frequencies and especially those less than 30 Hz to greatly reduce the chances that audible frequency signals in the decoder will be introduced into audio channels that are derived from the decoder.

More detailed description relating to the operation of standard FM- and FMX-capable receivers under multipath conditions is provided in the patent application to T. Field and O. Richards entitled *FM Stereo Tone Detector* and the application by O. Richards entitled *Blend-On-Noise Stereo Decoder*. Both applications are assigned to the same assignee as is the present invention and both applications were filed concurrently with the present application.

What is claimed is:

1. A stereo FM broadcast radio receiver including a variable bandwidth FM stereo decoder comprising:
   (a) a composite-stereo-multiplex-signal input conductor;
   (b) a phase-difference detector having one input connected to said composite-signal input conductor;
   (c) an electrically controlled oscillator having a control-signal input connected to the output of said phase-difference detector and an output connected to the other input of said phase-difference detector to form a phase-locked loop;
   (d) a dual-filter circuit means being connected in said loop, having a binary-signal input conductor, for establishing the bandpass of said loop to include frequencies of several hundred Hertz within audible range when a binary input signal at said binary-signal conductor is in one electrical state and for establishing the bandpass of said loop to include only frequencies below the audible range when the binary input signal at said binary-signal conductor is in the other state; and
   (e) a binary signal generating means connected to said loop having an output connected to said binary-signal conductor for generating a binary output signal that is in said another state and in said one state respectively when said oscillator is locked and when it is not locked to a pilot frequency component of a signal at said composite-stereo-multiplex-signal input conductor.

2. The FM broadcast radio receiver and stereo decoder of claim 1 wherein said bandpass covering frequencies of below audible range extends only up to about 30 Hertz.

3. The FM broadcast radio receiver and stereo decoder of claim 1 wherein said loop bandpass is from 0 to about 300 Hertz when said oscillator is not locked and is from 0 to about 30 Hertz when said oscillator is locked to said pilot component of said composite signal.

4. The FM broadcast radio receiver and stereo decoder of claim 1 wherein said oscillator output is connected to said other phase-difference detector input via a times-two frequency divider so that said oscillator frequency is double that of said pilot component when said loop is locked to said pilot component frequency.

5. The FM broadcast radio receiver and stereo decoder of claim 2 wherein said binary signal generating means includes a phase inverter, a threshold detector circuit and a phase comparator means with a first input connected to said input of said phase difference detector and a second input connected via said inverter stage to said oscillator output and with an output connected to the input of said threshold detector circuit, the output of said threshold detector circuit being said binary generating means output.

* * * * *